United States Patent
Shima et al.

(10) Patent No.: US 7,266,221 B2
(45) Date of Patent: Sep. 4, 2007

(54) RANGING DEVICE UTILIZING IMAGE PROCESSING

(75) Inventors: Nobukazu Shima, Kobe (JP); Akihiro Oota, Kobe (JP); Kenji Oka, Kobe (JP)

(73) Assignee: Fujitsu Ten Limited (JP)

( * ) Notice: Subject to any disclaimer, the term of this patent is extended or adjusted under 35 U.S.C. 154(b) by 791 days.

(21) Appl. No.: 10/254,035

(22) Filed: Sep. 24, 2002

(65) Prior Publication Data

US 2003/0081815 A1    May 1, 2003

(30) Foreign Application Priority Data

Sep. 25, 2001   (JP)   ............... 2001-292160

(51) Int. Cl.
*G06K 9/00* (2006.01)
*G06K 9/52* (2006.01)
*H04N 7/18* (2006.01)
*G08G 1/16* (2006.01)

(52) U.S. Cl. .............. 382/106; 382/103; 382/104; 382/154; 382/206; 348/118; 340/903; 340/937

(58) Field of Classification Search ............... 382/104, 382/105, 106, 154, 174, 206; 348/113, 118, 348/119, 148; 340/901, 903, 933, 934, 937
See application file for complete search history.

(56) References Cited

U.S. PATENT DOCUMENTS

| | | | | |
|---|---|---|---|---|
| 4,931,937 A | * | 6/1990 | Kakinami et al. ......... | 701/300 |
| 5,177,606 A | * | 1/1993 | Koshizawa ................. | 348/118 |
| 5,196,929 A | * | 3/1993 | Miyasaka ................... | 348/169 |
| 5,304,980 A | * | 4/1994 | Maekawa ................... | 340/435 |
| 5,592,567 A | * | 1/1997 | Kilger ....................... | 382/199 |
| 5,706,362 A | * | 1/1998 | Yabe ......................... | 382/103 |
| 6,141,435 A | * | 10/2000 | Naoi et al. ................. | 382/104 |
| 2003/0141762 A1 | * | 7/2003 | Sartori et al. ............. | 307/10.1 |

FOREIGN PATENT DOCUMENTS

JP         11-339017         12/1999

* cited by examiner

*Primary Examiner*—Andrew W. Johns
*Assistant Examiner*—Anthony Mackowey
(74) *Attorney, Agent, or Firm*—David N. Fogg; Fogg & Powers LLC

(57) ABSTRACT

An image size changing section obtains a size-changed image by changing the size of one of two original images captured by a pair of cameras. If an edge of an object has many oblique components, the edge is difficult to detect as a vertical edge but, when the image is horizontally reduced, an oblique edge becomes close to a vertical edge. For this reason, a feature end points are extracted with reliability by a feature extracting section and, thereby, an object is recognized and the distance to the object is determined reliably.

2 Claims, 9 Drawing Sheets

Fig.2
(A)
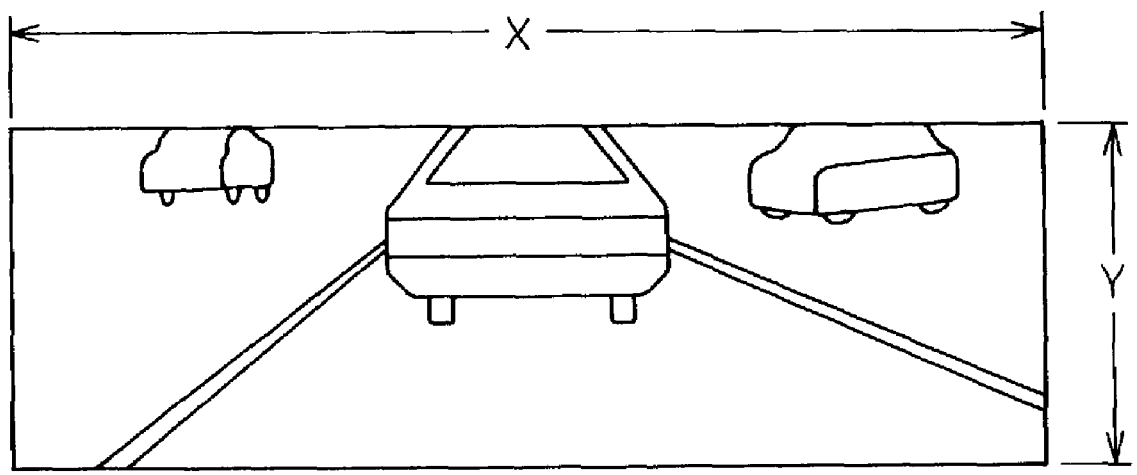
(B)
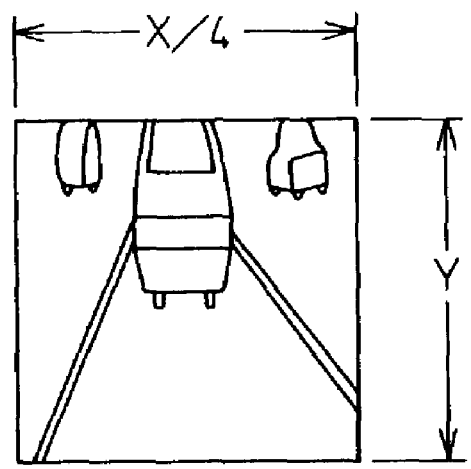

Fig.5
(A)
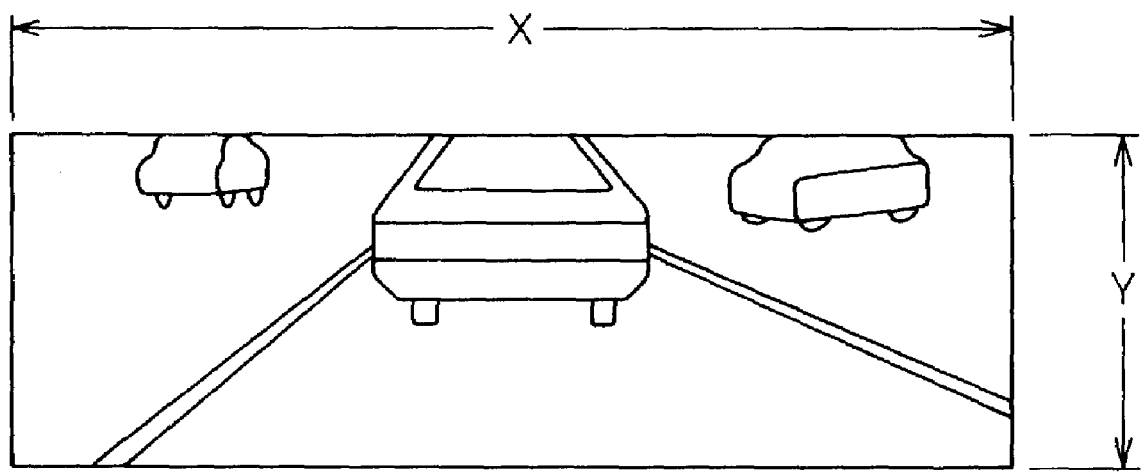
(B)
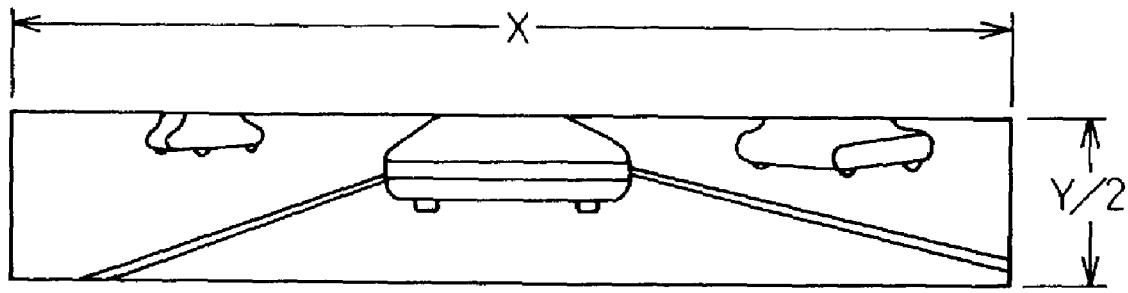

Fig.8
(A)
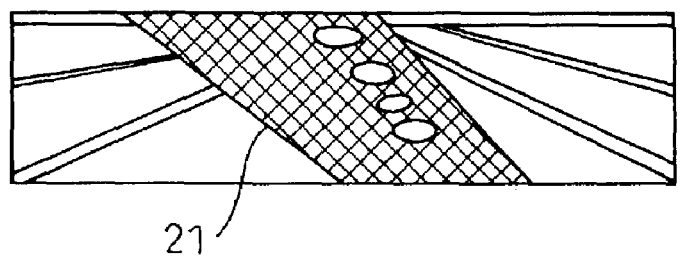
(B)
(C)
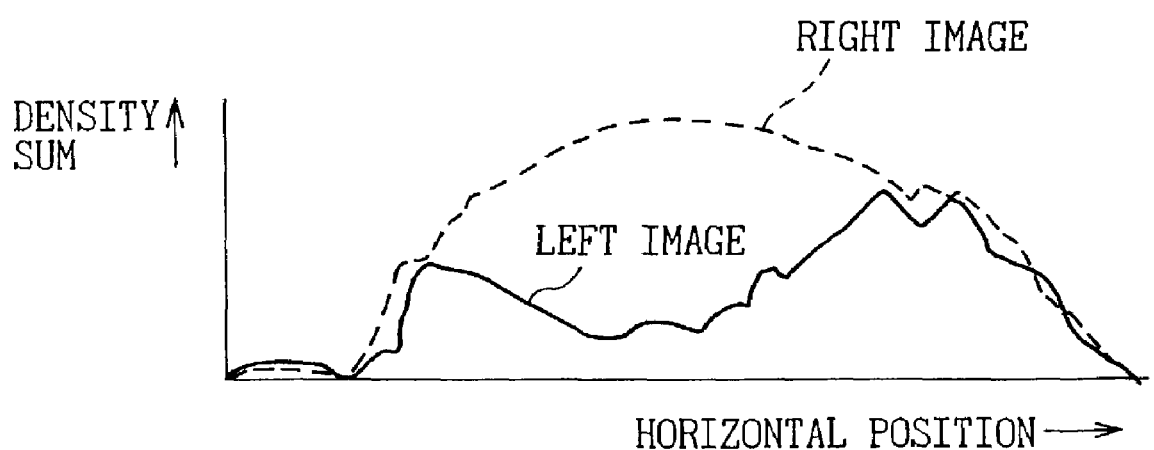

though the present invention relates to a ranging device for recognizing an object in front of it to determine the distance to the object by utilizing image processing. The ranging device is used for, for example, a driving support system of a vehicle, etc.

RANGING DEVICE UTILIZING IMAGE PROCESSING

This application claims priority to Japanese Patent Application No. 2001-292160 filed on Sep. 25, 2001.

BACKGROUND OF THE INVENTION

1. Field of the Invention

The present invention relates to a ranging device for recognizing an object in front of it to determine the distance to the object by utilizing image processing. The ranging device is used for, for example, a driving support system of a vehicle, etc.

2. Description of the Related Art

An image-processing ranging system using a pair of cameras typically utilizes a range-image method. In this method, the amount of processing is large, and a high-performance CPU and a large-scale circuit are required.

In order to reduce the amount of processing and improve the accuracy for distance determination, portions having many features are extracted from an image, and distance determination is performed only for the positions where the features are extracted. Feature extraction is performed by, for example, an edge extracting process, etc. Distance determination is performed by a pattern matching process. Thus, high performance distance determination, at the same level as the above range-image system, can be carried out while the amount of processing is reduced.

However, the problems listed below occur when edge extracting and pattern matching processes are used.

(1) If a vertical edge is not extracted in a feature extracting process, the distance to an object to be recognized in front of a ranging device cannot be determined. In particular, for an object having many oblique edges, portions having many features are difficult to detect by an edge extracting process.

(2) Accurate feature extraction increases the required amount of processing, thereby increasing the time of processing. For this reason, the amount of processing must be reduced (3) The image of a windshield wiper or the like passing in front of a pair of cameras may be captured by the cameras. In such cases, it must be prevented that the distance is not determined or determined improperly due to the image of the windshield wiper or the like.

SUMMARY OF THE INVENTION

It is therefore an object of the present invention to provide a ranging device, utilizing image processing, capable of accurate and speedy processing in case of the determination of the distance to an object having many oblique edges or the like.

It is another object of the present invention to provide a ranging device, utilizing image processing, having a diagnosis function of preventing an improper distance determination caused by a windshield wiper or the like In a ranging device utilizing image processing according to the present invention, the size of one of two images input from a pair of cameras is changed for the purpose of extracting feature end points. For example, even if an object has many oblique edges, the oblique edges are made close to vertical edges by reducing the image. For this reason, a feature end points can be extracted with reliability by a feature extracting section, and thereby it can be prevented that the distance to an object is not determined.

From the size-changed image described above, the coordinates of the extracted feature end points are obtained. From the above one of two original images, a pattern of a prescribed size including a feature end points is extracted. The coordinates in the other one of two original images on the axis on which the coordinate of the above pattern exits are searched for, and a coordinate most correlating with the coordinate of the above pattern is detected. Then, based on the difference between the coordinates of the pattern in the two images, an object is recognized and the distance to the object is determined.

Using a ranging device utilizing image processing according to the present invention, the feature end points (vertical edge) of an object having many oblique edges may also be extracted with reliability and, thereby, it can be prevented that the distance to the object is not determined. The change of image size is not limited to a reduction of horizontal size, and a reduction of vertical or oblique size may be adopted according to the direction of an edge to be extracted.

Many modifications are possible in light of the above teaching of the present invention. By extracting the feature end points of an object to determine the distance to the object using two original images at the same time when extracting the feature end points of the object to determine the distance to the object using two horizontally reduced images, and then merging the two results, more accurate recognition of the object and determination of the distance to the object become possible.

However, in this case, the amount of processing increases. In contrast to this, by using a vertically reduced image instead of an original image, the amount of processing can be reduced. By using vertically reduced images, the amount of processing can be reduced while keeping the accuracy of distance measurement.

When a horizontally reduced image and a vertically reduced image are used as described above, the horizontally reduced image may be used only for the extraction of a feature end points, and the vertically reduced image may be used for the distance measurement. Thus, both a speed-up of processing and an improvement of accuracy for distance measurement can be achieved.

Furthermore, in this case, accurate object recognition can be achieved by extracting a feature end points also from the vertically reduced image, and merging the feature end points extracted from the vertically reduced image with the feature end points extracted from the horizontally reduced image.

The present invention also provides a ranging device utilizing image processing having a diagnosis function of determining whether the image of a windshield wiper or the like is captured by a camera. By this diagnosis function, the vertical sum of densities in each of two images captured by a pair of cameras, or captured one after the other by one of a pair of cameras is calculated, and when the difference between the two sums is larger than a predetermined value, it is determined that the image of a windshield wiper or the like is captured by either of the two cameras, to output a diagnosis signal.

Since the cameras of the ranging device utilizing image processing are disposed at the back of the windshield of a vehicle, the image of a windshield wiper may be captured by the cameras. The windshield wiper passes near the camera, and the moving speed of the windshield wiper is lower than the image capturing speed of the camera. For this reason, the image of the windshield wiper is captured by only one of the two cameras and, thereby, it can be determined whether the image of the windshield wiper is captured based on the difference between both of the vertical sums of densities in the two images.

When the image of a windshield wiper is captured, a diagnosis signal is output. The image for which the diagnosis signal is output is not used for object recognition and distance determination.

BRIEF DESCRIPTION OF THE DRAWINGS

The above object and features of the present invention will be more apparent from the following descriptions of the preferred embodiments with reference to the accompanying drawings Wherein

FIG. 2 shows an original image and a horizontally reduced image created by the ranging device in FIG. 1;

FIG. 5 shows a horizontally reduced image and a vertically reduced image created by the ranging device in FIG. 4;

FIG. 8 depicts density summation by the ranging device in FIG. 7; and

DESCRIPTION OF THE PREFERRED EMBODIMENTS

The preferred embodiments of the present invention will be discussed with reference to the accompanying drawings.

First Embodiment

Figure 1:
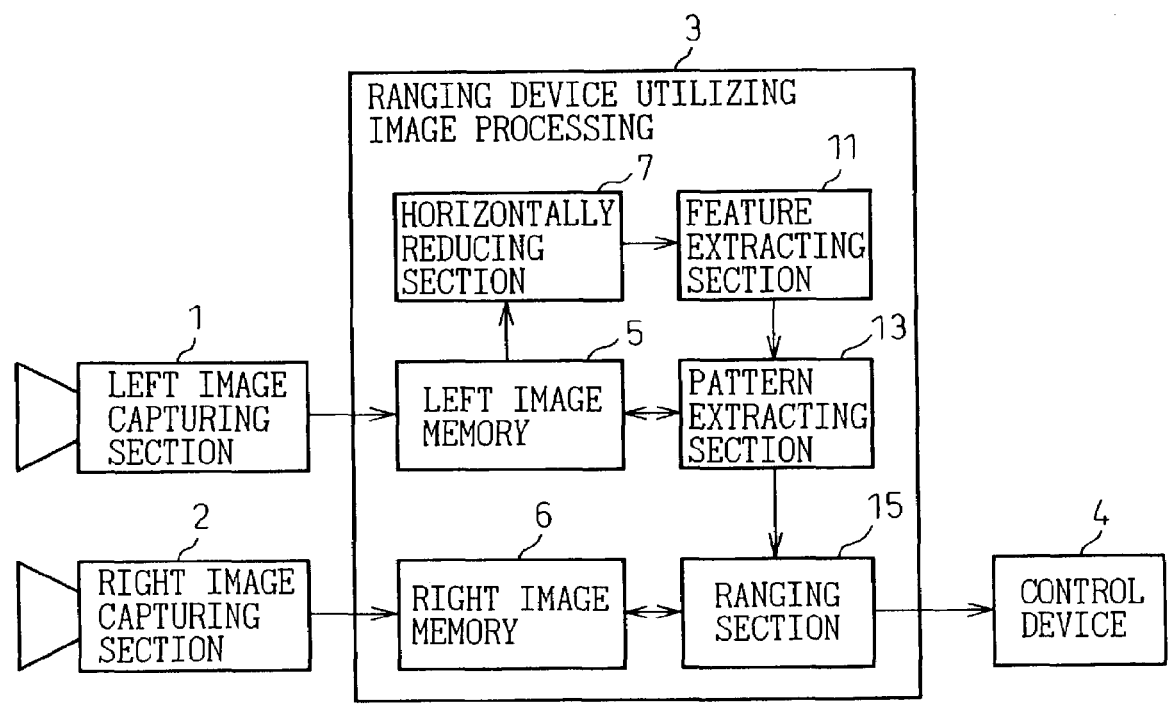
FIG. 1 shows the configuration of a first embodiment of a ranging device utilizing image processing according to the present invention.

A first embodiment of a ranging device utilizing image processing according to the present invention will be discussed with reference to FIG. 1. FIG. 1 shows an example ranging device utilizing image processing used for a vehicle running control device.

Image capturing sections such as CCD cameras are mounted on a vehicle and face forward. The image capturing sections consists of a pair of cameras, i.e., a left image capturing section 1 and a right image capturing section 2. Images output from the image capturing sections 1 and 2 are input to a ranging device utilizing image processing 3. The result of the distance determination by the ranging device 4 utilizing image processing 3 is output to a control device for controlling the distance between vehicles or the like.

In the ranging device utilizing image processing 3, the left and right images input to it are stored in a left image memory 5 and a right image memory 6 respectively. These images are stored as original images. The horizontal reducing section 7 creates a horizontally reduced image by reducing the horizontal size of an original image stored in the left image memory 5, and stores the created horizontally reduced image in it.

A horizontally reduced image will be explained with reference to FIG. 2. (A) shows an original image and (B) shows a horizontally reduced image. When the horizontal and the vertical sizes of the original image are the length of X pixels and the length of Y pixels respectively, the horizontal and the vertical sizes of the horizontally reduced image are a quarter of the original length of X pixels and same as the original length of Y pixels respectively.

The feature extracting section 11 in FIG. 1 extracts feature end points (vertical edge) from a horizontally reduced image. The feature extracting section 11 scans the reduced image in horizontal direction to detect edges at positions where brightness, color, or the like change. When some edges in a vertical direction are detected continuously, they are extracted as a vertical edge.

In the example shown in FIG. 2, the image of the vehicle in front in the original image (A) includes oblique edges on its outline. Oblique edges are difficult to extract as a vertical edge by an ordinary edge extraction method. In contrast to this, oblique edges are close to vertical edges in the horizontally reduced image (B), and thereby a feature end points can be extracted reliably.

The pattern extracting section 13 in FIG. 1 extracts a pattern of a prescribed size and its coordinate based on the positions, in the original image stored in the left image memory 5, corresponding to the feature end points (vertical edge) extracted from the horizontally reduced image.

The ranging section 15 searches for coordinates on the horizontal axis, in the original image stored in the right image memory 6, on which the coordinate of the pattern extracted from the original left image exists, to detect the coordinate (pattern coordinate) of a position most correlating with the pattern. The ranging section 15 then determines the distance to the object based on the difference between the pattern coordinate of the original left image and the pattern coordinate of the original right image.

The ranging section 15 outputs the result of recognizing the object and the distance to the object as the result of the distance determination.

The control device 4 controls the distance between vehicles, etc. by using the result of the distance determination input to it.

The ranging device utilizing image processing described above can detect, with reliability, an edge including many oblique components, as a vertical edge, including feature end points, with the feature extracting section 11, thereby preventing the distance to an object not being determined.

In this embodiment, images are reduced in the horizontal direction but images may be reduced in the vertical direction or another direction. For example, vertical reduction is advantageous when horizontal edges are extracted by arranging a pair of cameras in a vertical direction.

Second Embodiment

Figure 3:
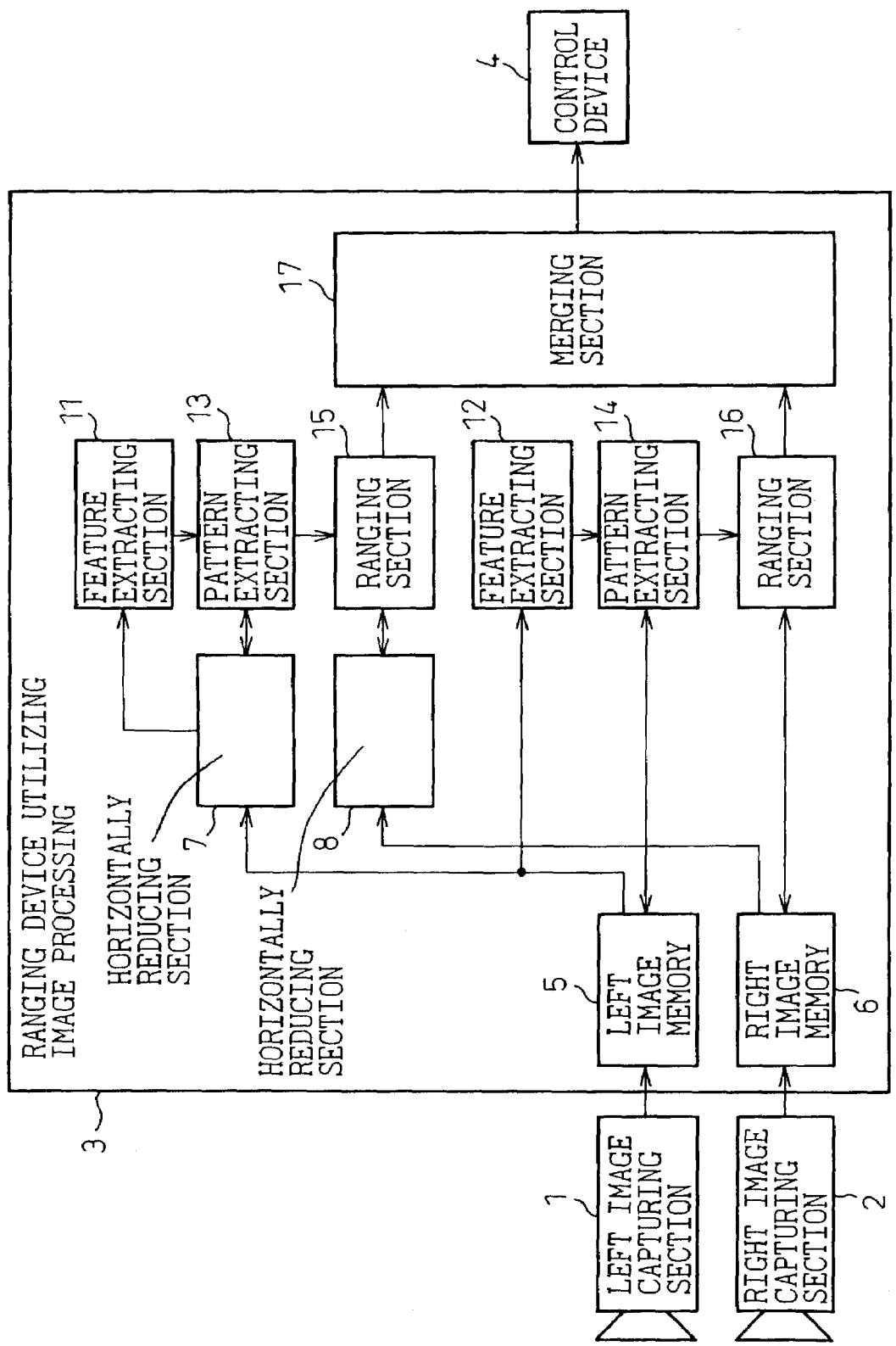
FIG. 3 shows the configuration of a second embodiment of a ranging device utilizing image processing according to the present invention.

A second embodiment of a ranging device utilizing image processing according to the present invention will be discussed with reference to FIG. 3. In this discussion, the points different from FIG. 1 will be mainly explained, but an explanation about points the same as in FIG. 1 will be omitted.

In this embodiment, both of an original left and right images are reduced horizontally, distance determination using the parallax of the horizontally reduced left and light images and distance determination using the parallax of the original left and light images are performed, and distance determination is also performed by merging the result of the distance determination using the reduced images and the result of the distance determination using the original images.

The left and light horizontally reducing sections 7, 8 horizontally reduce the original images stored in the left and light image memories 5, 6 respectively, and store respective reduced images in the respective sections.

When the feature extracting section 11 extracts a vertical edge from the horizontally reduced left image, the pattern extracting section 13 extracts a pattern of prescribed size and its coordinate, from the same horizontally reduced left image, based on the position where the vertical edge is extracted.

The ranging section 15 extracts the coordinate of the position most correlating with the pattern extracted by the pattern extracting section 13, from the horizontally reduced right image. The ranging section 15 then determines the distance to the object based on the difference between the pattern coordinate extracted from the horizontally reduced left image and the pattern coordinate extracted from the horizontally reduced right image. The result of the distance determination is output to the merging section 17.

The same processing is performed for the original images stored in the left and light image memories 5, 6. The feature extracting section 12 extracts a vertical edge from the original left edge. The pattern extracting section 14 extracts a pattern of prescribed size and its coordinate, from the same original left image, based on the position where the vertical edge is extracted. The ranging section 16 extracts the coordinate (pattern coordinate) of the position most correlating with the pattern extracted by the pattern extracting section 14, from the original right image. The ranging section 16 then determines the distance to the object based on the difference between the pattern coordinate extracted from the left image and the pattern coordinate extracted from the right image. The result of the distance determination is output to the merging section 17.

The merging section 17 recognizes the object to determine the distance to the object based on the results obtained from the horizontally reduced images and the original images. The result obtained from the horizontally reduced images allows an accurate recognition of the object, and the result obtained from the original images allows an accurate determination of the distance to the object. The merging section 17 performs an accurate determination of the distance to the object in consideration of such characteristics.

Third Embodiment

Compared with the first embodiment, the second embodiment improves the accuracy of distance determination, but requires twice as much processing because edge extraction and pattern extraction are performed for both of horizontally reduced images and original images. This affects processing time, etc.

The third embodiment reduces the amount of processing by using vertically reduced images instead of the original images used in the second embodiment.

Figure 4:
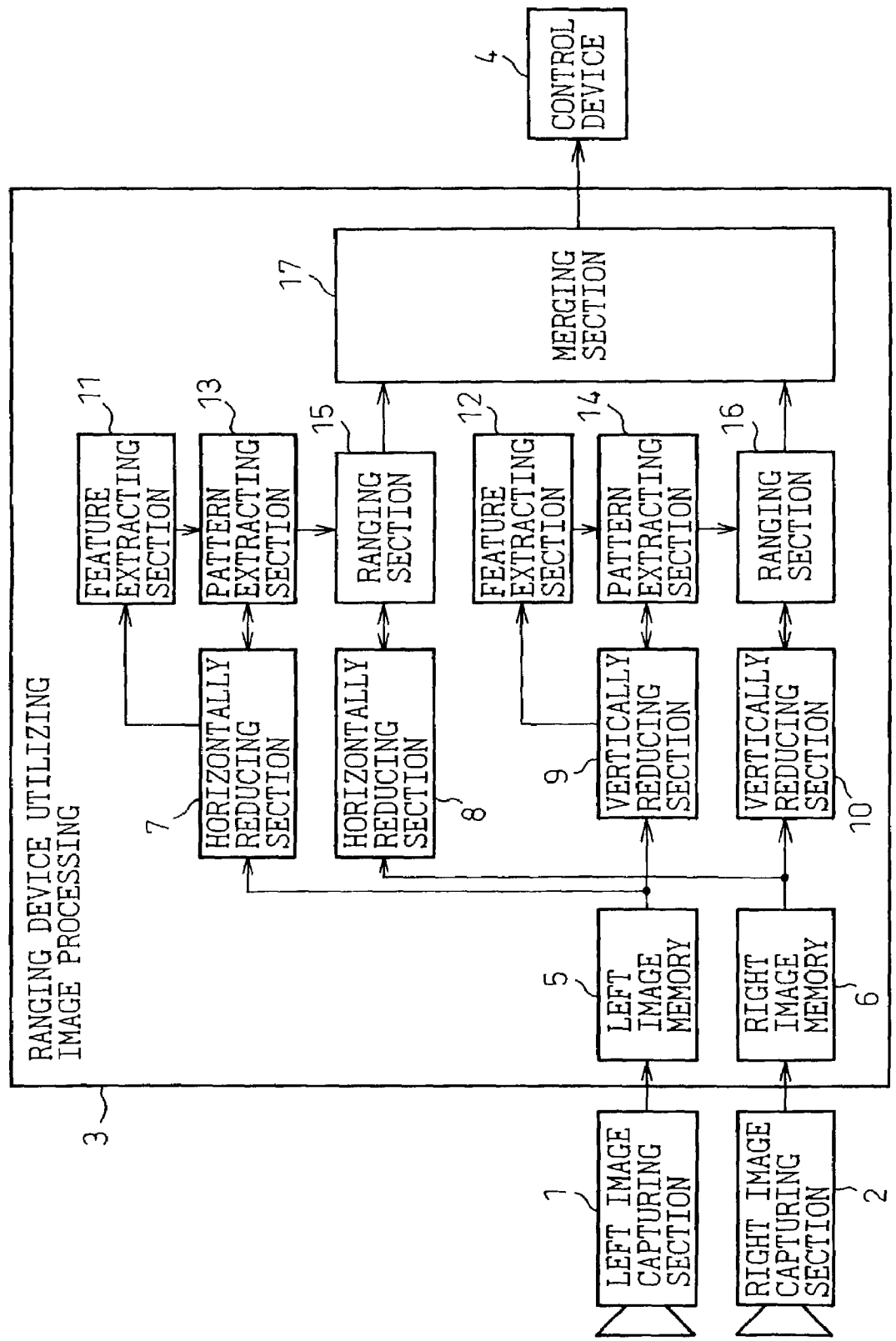
FIG. 4 shows the configuration of a third embodiment of a ranging device utilizing image processing according to the present invention.

FIG. 4 shows the configuration of the third embodiment of a ranging device utilizing image processing according to the present invention. FIG. 4 is different from FIG. 3 in that the vertically reducing sections 9, 10 are provided which vertically reduces the original images stored in the left and light image memories 5, 6 and store the respective reduced images in the respective sections.

A vertically reduced image will be explained with reference to FIG. 5. (A) shows an original image and (B) shows a vertically reduced image. When the horizontal and the vertical sizes of the original image are the length of X pixels and the length of Y pixels respectively, the horizontal and the vertical sizes of the vertically reduced image are same as the original length of X pixels and a half of the original length of Y pixels respectively. As the number of horizontal pixels in a vertically reduced image, based on which the accuracy of distance determination is determined, is not reduced, accurate distance determination is ensured. The amount of processing decreases with a decrease in number of pixels in the vertical direction. Thus, the speed-up of the processing can be achieved by using vertically reduced images.

Distance determination using the vertically reduced left and right images is performed by the feature extracting section 12, pattern extracting section 14, and ranging section 16, as in distance determination using the original images in the second embodiment. The results of object recognition and distance determination are output from the ranging section 16 to the merging section 17.

The merging section 17 recognizes the object to determine the distance to the object based on both of the results obtained from the horizontally reduced images and the vertically reduced images.

Fourth Embodiment

Figure 6:
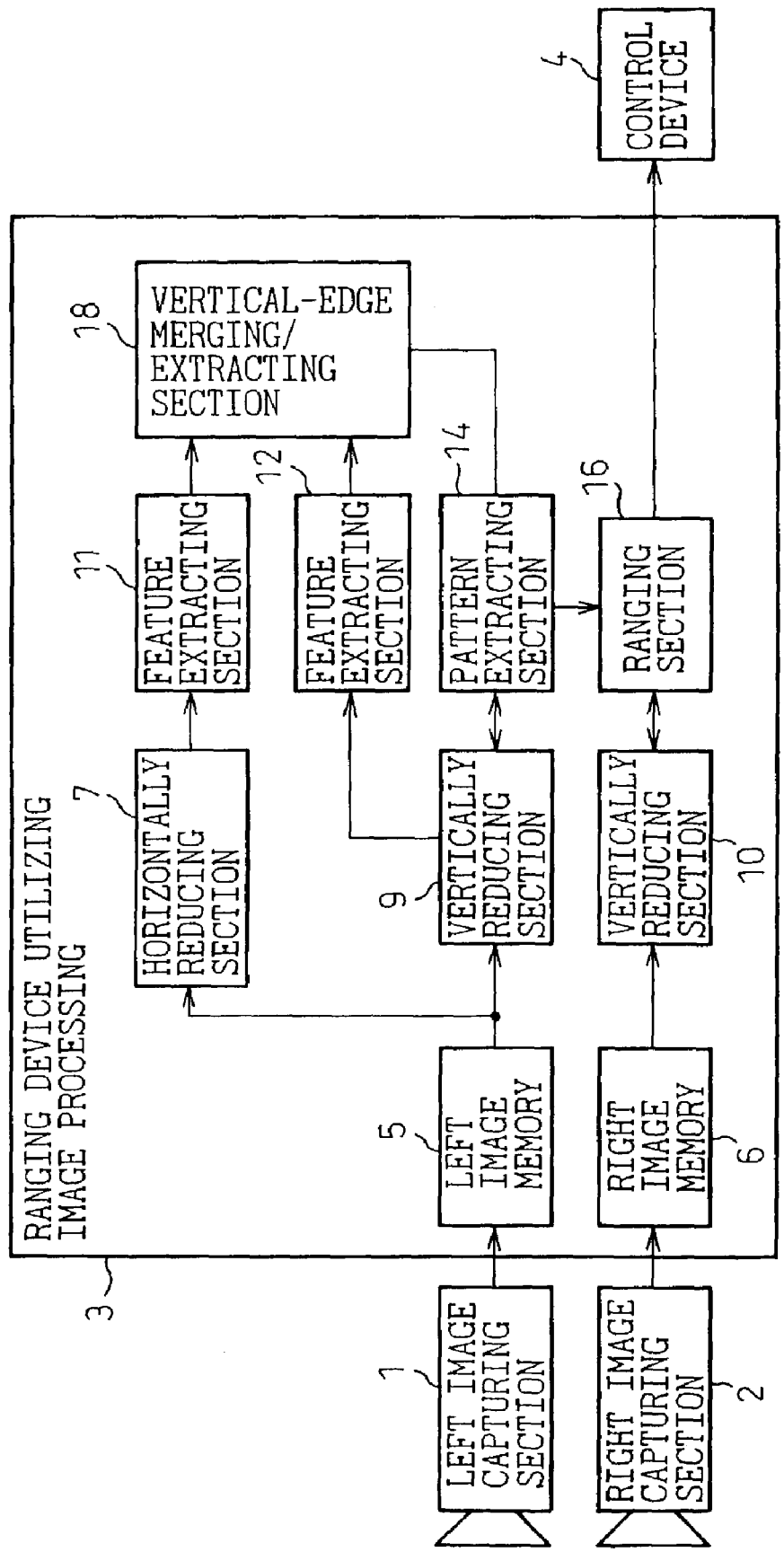
FIG. 6 shows the configuration of a fourth embodiment of a ranging device utilizing image processing according to the present invention.

A fourth embodiment of a ranging device utilizing image processing according to the present invention will be discussed with reference to FIG. 6.

The horizontally reducing section 7 creates a horizontally reduced image from an original image in the left image memory 5 and stores the reduced image in the reducing section 7. The feature extracting section 11 extracts a vertical edge from the horizontally reduced image and outputs the extracted vertical edge to the vertical-edge merging/extracting section 18. In this embodiment, horizontally reduced images are used only for vertical-edge extraction but are not used for distance determination.

Vertically reduced images are created and stored by the vertically reducing sections 9, 10, and a vertical edge extracted by the feature extracting section 12 is input to the vertical-edge merging/extracting section 18.

The vertical-edge merging/extracting section 18 further determines a vertical edge of an object based on both of the vertical edges extracted. For example, centering the positions where feature end points of an object are extracted from the horizontally reduced image, feature end points of the same object are detected in the vertically reduced image.

The pattern extracting section 14 extracts a pattern from the vertically reduced left image based on the vertical edge determined by the vertical-edge merging/extracting section 18. The ranging section 16 determines the distance to the object based on the difference between the pattern coordinate in the vertically reduced left image and the pattern coordinate in the vertically reduced right image.

In this embodiment, a vertical edge is extracted from a horizontally reduced image allowing more accurate edge extraction, and distance determination is performed using a vertically reduced image requiring smaller amount of processing, and thereby compatibility between high speed processing and accurate distance determination can be realized.

Fifth Embodiment

Left and light image capturing sections 1, 2 are disposed in a vehicle at the back of the windshield of the vehicle in order to watch objects in front of the vehicle. For this reason, the image of the windshield wiper may be captured by the capturing sections 1,2 when the windshield wiper is moving. Processing an image in which the image of the windshield wiper is included to determine the distance to an object causes that the distance is not determined or determined improperly. This embodiment includes a diagnosis function for preventing incorrect processing caused by capturing the image of the windshield wiper.

Figure 7:
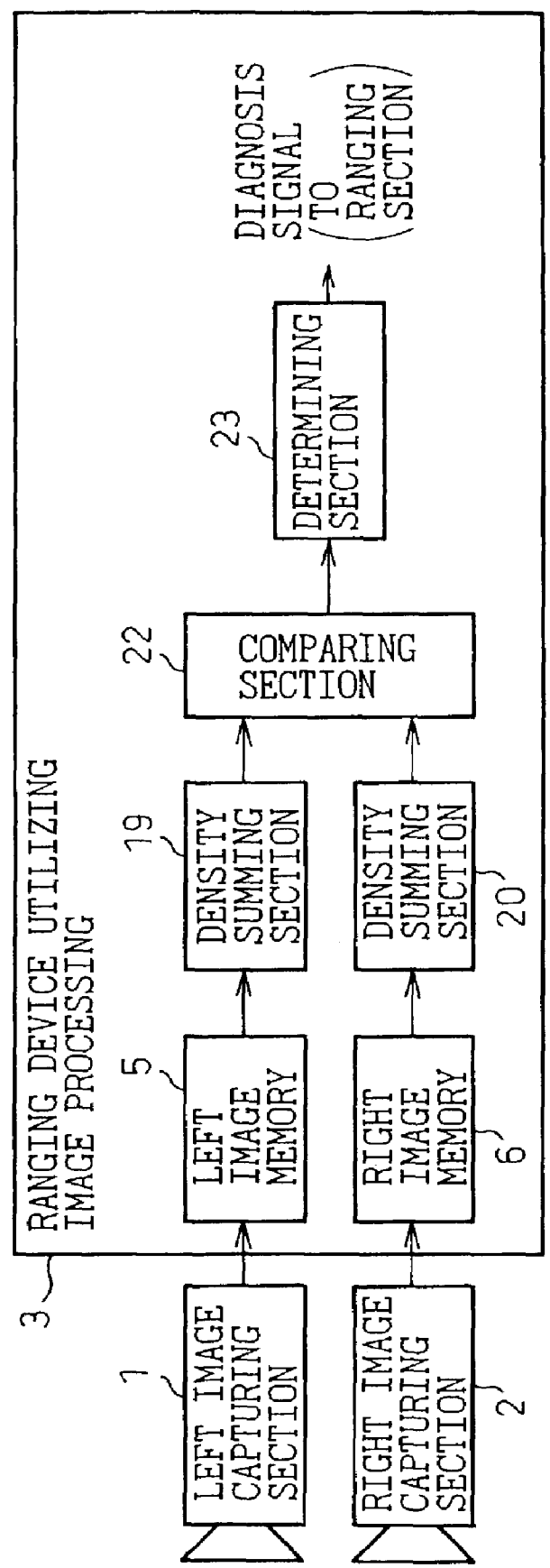
FIG. 7 shows the configuration of a fifth embodiment of a ranging device utilizing image processing according to the present invention.

FIG. 7 shows only components to implement the diagnosis function of the ranging device utilizing image processing 3.

Densities of the original images stored in the left and light image memories 5, 6 are summed in vertical direction by the density summing sections 19, 20 respectively.

The density summation will be explained with reference to FIG. 8.

(A) is an image captured by the left image capturing section 1, in which the image of a windshield wiper 21 is included. (B) is an image captured by the right image capturing section 2, in which the image of a windshield wiper 21 is not included.

Since the moving speed of the windshield wiper is far lower than the image capturing speed of the image capturing sections 1, 2, the image of the windshield is not captured by both of the left and light image capturing sections 1, 2 at the same time, as shown in (A) and (B).

(C) shows the sums in vertical direction of the densities of the left and right images (A), (B). That is, (C) shows the sums in vertical direction of values of brightness of pixels. In the example shown in (C), the densities at positions of the image of the windshield in the left image are lower than the densities at the other positions.

In FIG. 7, the comparing section 22 compares the sum of the densities of the left image and the sum of the densities of the right image, and the determining section 23 determines whether the difference between both of the sums is larger than a predetermined reference value. When the difference between the sums is larger than the reference value, the determining section 23 determines that an image of a windshield wiper has been captured, and outputs a diagnosis signal.

The diagnosis signal is output to the ranging sections 15, 16 described above. The ranging sections 15, 16 do not perform the distance determination when a diagnosis signal is detected.

In this embodiment, good result of distance determination can be obtained also when a windshield wiper is operated in the rain.

Sixth Embodiment

In this embodiment, a diagnosis signal can be created by comparing the sums of the densities of two images captured one after the other by one of left and light image capturing sections 1, 2 instead of comparing the sums of the densities of the left and light images as in the fifth embodiment.

Figure 9:
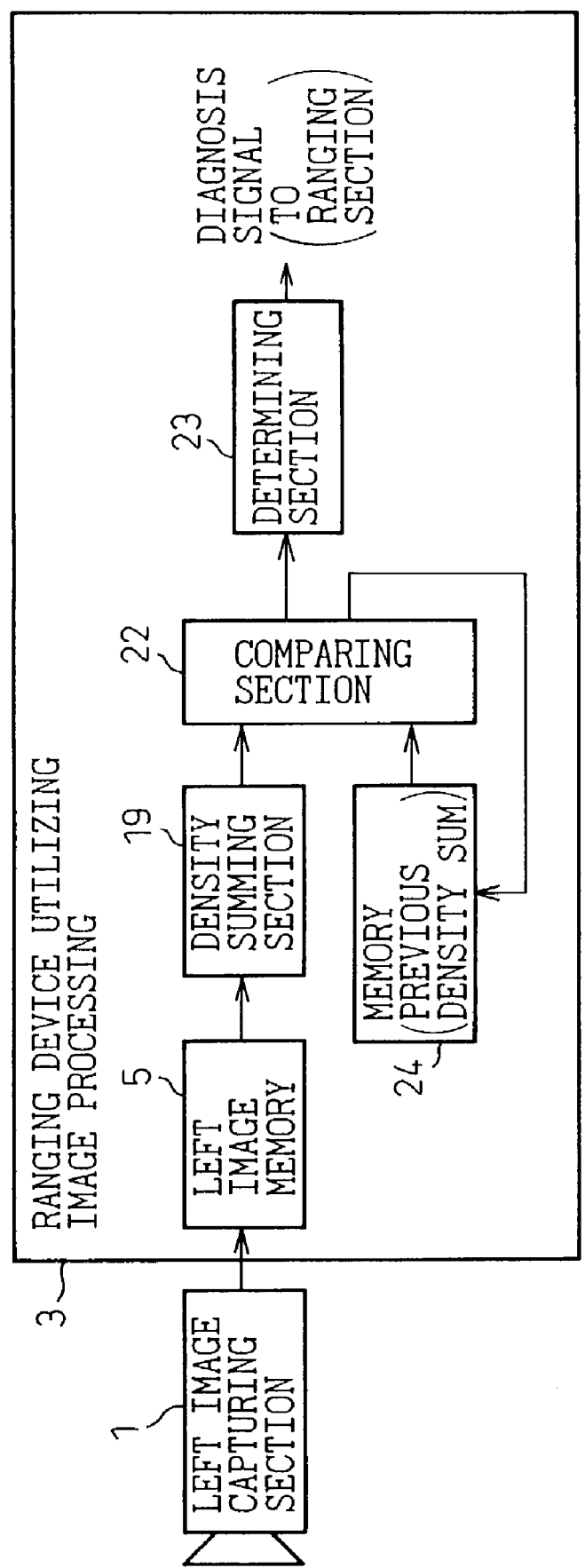
FIG. 9 shows the configuration of a sixth embodiment of a ranging device utilizing image processing according to the present invention.

FIG. 9 shows only components to implement the diagnosis function of the ranging device utilizing image processing 3 of this embodiment.

The density summing section 19 sums up the densities of the image stored in the left image memory 5. The sum is input to the comparing section 22 and then stored in the memory 24 as a previous density sum.

The comparing section 22 compares the sum of the densities of a next image stored in the density summing section 19 with the previous density sum stored in the memory 24. The operation of the determining section 23 is the same as the operation in the fifth embodiment described above.

According to the present invention, it is possible to provide a ranging device utilizing image processing which can recognize an object having many oblique edges, prevent that an object is recognized improperly to determine the distance to the object, and realize high speed processing.

According to the present invention, it is also possible to provide a ranging device utilizing image processing having a diagnosis function of preventing an improper distance determination caused by a windshield wiper, or the like.

The invention claimed is:

1. A ranging device utilizing image processing for recognizing an object in front of said ranging device to determine the distance to said object by processing images captured by a camera facing forward, comprising:
   a density summing section for obtaining the sum of densities in the vertical direction of each of an image and a subsequent image captured by said camera;
   a comparing section for comparing the sum of densities in the vertical direction of each of an image and a subsequent image;
   a determining section for determining that the image of an object which causes an erroneous ranging is included, in one of said image and said subsequent image, when the difference between said sum of densities in the vertical direction of each of said image and said subsequent image is larger than a predetermined value, to output a signal; and
   a ranging section for recognizing an object in front of said ranging device to determine the distance to said object while omitting images for which said signal is output.

2. The ranging device utilizing image processing of claim 1, wherein the object which causes said erroneous ranging is a windshield wiper.

* * * * *